United States Patent
McAlpine et al.

(10) Patent No.: US 10,718,093 B2
(45) Date of Patent: Jul. 21, 2020

(54) SYSTEM AND METHOD FOR MONITORING PAVING SYSTEM COMPONENTS

(71) Applicant: Caterpillar Paving Products Inc., Brooklyn Park, MN (US)

(72) Inventors: Jacob J. McAlpine, Otsego, MN (US); John L. Marsolek, Watertown, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 0 days.

(21) Appl. No.: 16/152,584

(22) Filed: Oct. 5, 2018

(65) Prior Publication Data
US 2020/0109527 A1    Apr. 9, 2020

(51) Int. Cl.
*E01C 19/00* (2006.01)
*E01C 19/48* (2006.01)
*G06Q 10/06* (2012.01)

(52) U.S. Cl.
CPC ... *E01C 19/4806* (2013.01); *G06Q 10/06313* (2013.01)

(58) Field of Classification Search
CPC ................... E01C 19/4806; G06Q 10/06313
USPC ............ 404/84.05–84.5, 118, 72, 82; 701/50
See application file for complete search history.

(56) References Cited

U.S. PATENT DOCUMENTS

| | | | |
|---|---|---|---|
| 7,031,930 B2 | 4/2006 | Freeman et al. | |
| 8,065,342 B1 * | 11/2011 | Borg | G06Q 10/06 707/803 |
| 8,255,358 B2 * | 8/2012 | Ballew | G06Q 10/10 340/679 |
| 8,944,719 B2 * | 2/2015 | Frelich | E01C 19/00 404/108 |
| 9,118,701 B2 | 8/2015 | Wesby | |
| 9,299,044 B2 | 3/2016 | Barbosa et al. | |
| 9,963,836 B1 * | 5/2018 | Brenner | E01C 19/00 |
| 2008/0086509 A1 * | 4/2008 | Wallace | G06F 16/285 |
| 2009/0154992 A1 * | 6/2009 | Greiner | G06Q 10/06 404/72 |
| 2009/0210277 A1 | 8/2009 | Hardin et al. | |
| 2012/0288328 A1 * | 11/2012 | Minich | E01C 23/07 404/72 |
| 2013/0290062 A1 | 10/2013 | Patel et al. | |
| 2014/0133906 A1 * | 5/2014 | Frelich | E01C 19/48 404/75 |
| 2014/0316837 A1 | 10/2014 | Fosburgh et al. | |
| 2015/0095336 A1 | 4/2015 | Green et al. | |
| 2017/0053220 A1 * | 2/2017 | Marsolek | G06Q 10/0637 |

(Continued)

*Primary Examiner* — Raymond W Addie
(74) *Attorney, Agent, or Firm* — Lee & Hayes, PLLC

(57) ABSTRACT

A method includes receiving project information including a project identifier uniquely identifying a paving project, and a first asset identifier uniquely identifying a first paving asset. The method also includes associating the project identifier with the first asset identifier, and receiving first location information indicating a first location of the first paving asset. The method further includes identifying a first processing machine disposed at a worksite associated with the paving project, wherein the first processing machine is identified based at least in part on the first location information and a geofence associated with the first processing machine. The method also includes associating the project identifier with a second asset identifier uniquely identifying the first processing machine.

20 Claims, 4 Drawing Sheets

(56) References Cited

U.S. PATENT DOCUMENTS

2019/0186086 A1\* 6/2019 Masuda .................. G06Q 10/00
2019/0385113 A1\* 12/2019 Dumitras ................ H04L 12/66
2020/0015040 A1\* 1/2020 Baird ..................... G08B 21/24

\* cited by examiner

SYSTEM AND METHOD FOR MONITORING PAVING SYSTEM COMPONENTS

TECHNICAL FIELD

The present disclosure relates to a paving system. More specifically, the present disclosure relates to a paving system including a control system configured to monitor operations of one or more paving system components.

BACKGROUND

Haul trucks, paving machines, compaction machines, and other paving system components are often used to perform a variety of tasks associated with a worksite. For example, one or more haul trucks may be used to transport paving material from a paving material plant to a worksite so that the paving material can be distributed along a work surface of the worksite by one or more paving machines. One or more compaction machines may follow behind the paving machine, and may be operable to compact the freshly-laid paving material to a desired density or stiffness. The operation of such machines must be coordinated in order to perform paving operations in an efficient manner. However, due to the large number of haul trucks, compaction machines, paving machines, and other paving system components associated with a typical paving project, and the dynamic nature of such paving system components, management of such paving projects can be challenging. For instance, it can be difficult for a paving project manager to ascertain which paving project the various haul trucks, paving machines, compaction machines, and other paving system components are currently assigned to. Additionally, paving material plants are often located remote from the worksite. Due to the distance between the paving material plant and the worksite, and the difficulties associated with transporting paving material from the paving material plant to the worksite, it can be difficult to manage the delivery of paving material to the worksite efficiently.

An example system for coordinating the activities of paving machines is described in U.S. Patent Application Publication No. 2013/0290062 (hereinafter referred to as the '062 reference). In particular, the '062 reference describes a system for implementing a computer-based method of coordinating activities associated with paving a roadway. The '062 reference describes, for example, a server configured to provide communication among system components. As explained in the '062 reference, the server may receive a communication from a transport truck indicating that a batch of paving material has been delivered to the roadway, and such a communication may be generated automatically by a truck computer system in conjunction with a global positioning system (GPS) receiver on the truck. The '062 reference does not, however, describe a system that provides project managers with the ability to determine which paving project a particular paving system component is associated with, and whether a particular paving system component is currently active. As a result, the efficiency of the paving system described in the '062 reference may suffer.

Example embodiments of the present disclosure are directed toward overcoming the deficiencies described above.

SUMMARY

In an example embodiment of the present disclosure, a method includes receiving project information with a controller, the project information including a project identifier uniquely identifying a paving project, and a first asset identifier uniquely identifying a first paving asset. The method also includes associating the project identifier with the first asset identifier in a memory associated with the controller, receiving first location information with the controller, the first location information indicating a first location of the first paving asset, and identifying, with the controller, a first processing machine disposed at a worksite associated with the paving project. In such a method, the first processing machine is identified based at least in part on the first location information and a geofence associated with the first processing machine. The method also includes based at least in part on identifying the first processing machine, associating, in the memory, the project identifier with a second asset identifier. In such a method, the second asset identifier uniquely identifies the first processing machine.

In another example embodiment of the present disclosure, a method includes receiving, with a controller, a project identifier uniquely identifying a paving project associated with a worksite, receiving, with the controller, a first asset identifier uniquely identifying a haul truck receiving paving material associated with the paving project, and associating the project identifier with the first asset identifier in a memory associated with the controller. The method also includes receiving, with the controller, first location information, wherein the first location information is generated using a location sensor of the haul truck and indicates a location of the haul truck. The method further includes determining, with the controller, that the location of the haul truck is within a geofence substantially surrounding a paving machine disposed at the worksite. The method also includes based at least in part on the determining, associating, in the memory, the project identifier with a second asset identifier, the second asset identifier uniquely identifying the paving machine, generating, with the controller, a project report indicating the project identifier in association with the first asset identifier and the second asset identifier.

In yet another example embodiment of the present disclosure, a paving system includes a controller, a haul truck configured to transport paving material from a paving material plant to a worksite remote from the controller, a location sensor configured to determine a location of the haul truck, and a paving machine disposed at the worksite and configured to receive paving material from the haul truck. In such an embodiment, the controller is configured to receive a project identifier uniquely identifying a paving project associated with the worksite, receive a first asset identifier uniquely identifying the haul truck, and associate the project identifier with the first asset identifier in a memory associated with the controller. The controller is also configured to receive first location information from the location sensor, the first location information indicating the location of the haul truck, determine, based at least in part on the first location information, that the location is within a geofence substantially surrounding the paving machine, and based at least in part on determining that the location is within the geofence, associate, in the memory, the project identifier with a second asset identifier, the second asset identifier uniquely identifying the paving machine. The controller is further configured to generate a project report indicating the project identifier in association with the first asset identifier and the second asset identifier.

DETAILED DESCRIPTION

Figure 1:
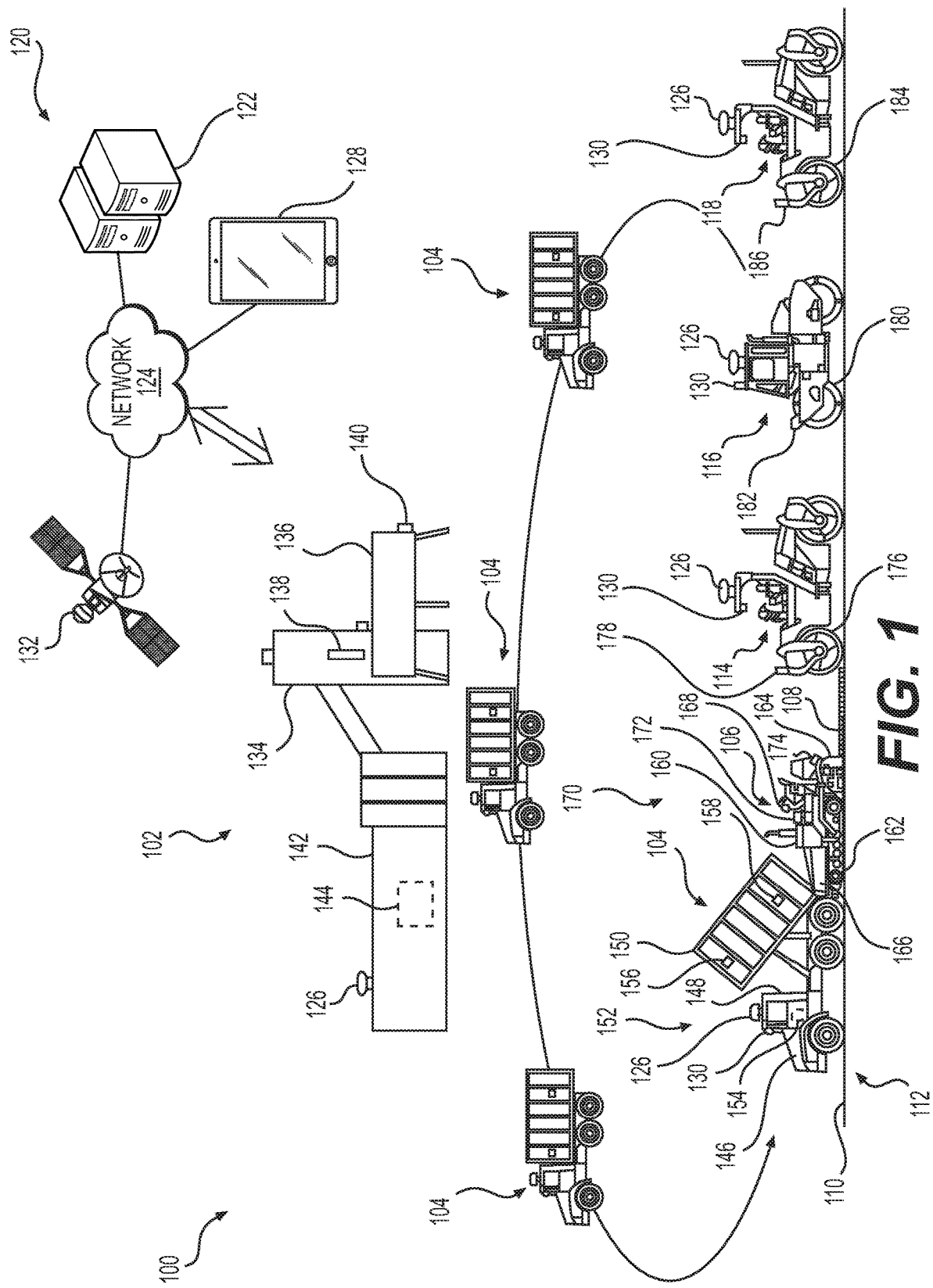
FIG. 1 is a schematic illustration of a paving system according to an example embodiment of the present disclosure.

Wherever possible, the same reference numbers will be used throughout the drawings to refer to the same or like parts. Referring to FIG. 1, an example paving system 100 may include one or more paving material plants 102, and a plurality of machines such as one or more haul trucks 104 and/or one or more paving machines 106. For example, the paving material plant 102 may include various equipment configured to heat, produce, sense, store, and/or transfer paving material 108 such as asphalt. For instance, one or more haul trucks 104 may be loaded with a desired amount of paving material 108 at the paving material plant 102. The one or more haul trucks 104 may be configured to travel along various travel paths extending from the paving material plant 102 to, for example, a work surface 110 of a worksite 112, and/or to the worksite 112 generally. Such travel paths may include one or more partially or completely formed roads, highways, bridges, service roads, or other surfaces passable by construction and/or paving machines, and such an example worksite 112 may include, for example, a construction site, a roadworksite, a parking lot, or any other type of job site. Once a haul truck 104 has delivered the paving material 108 to the worksite 112, the haul truck 104 may transfer the paving material 108 to a hopper or other component of the paving machine 106, and the paving machine 106 may apply the paving material 108 to and/or otherwise deposit the paving material 108 on the work surface 110 in the form of a substantially flat, substantially smooth paving material mat. The paving system 100 may also include one or more other machines, such as one or more compaction machines 114, 116, 118, one or more cold planers or other excavation machines (not shown), and/or one or more remixing transfer vehicles (not shown). In such examples, the one or more compaction machines 114, 116, 118 may be configured to compact the mat of paving material 108 to a desired density. It is understood that the overall efficiency of the paving system 100 may be maximized when the haul trucks 104, paving machine 106, compaction machines 114, 116, 118 and/or other components of the paving system 100 are operating at optimal speeds and without stoppages caused by delays in paving material production, delays in paving material delivery, inadequate paving system resources, etc. Accordingly, in order to maximize the efficiency of the paving system 100, embodiments of the present disclosure may be used to provide project managers with the ability to determine which paving project a particular paving system component is associated with, and whether a particular paving system component is currently active. Operating the paving system 100 based on and/or in view of such information may improve the overall efficiency of the paving system 100, and may maximize the quality of the mat of paving material being formed by the paving system 100.

In example embodiments, the paving material plant 102 may produce paving material 108 such as asphalt from bitumen, aggregate, and other materials or fillers. The paving material 108 is often produced in batches with each batch stored or held in a separate storage or holding location, such as a silo, until it is loaded into a haul truck 104 at a loading station. Each holding location may be dedicated to storing or holding paving material 108 for a particular worksite 112 and paving material 108 within a particular holding location is periodically loaded into a haul truck 104 for transport to the worksite 112. The characteristics of each batch stored within a holding location may be set based upon the desired characteristics for a particular paving job. For example, the amount of oil and the size of the aggregate may be set based upon the desired characteristics of the paving material 108 and the requirements of each paving job.

Each batch of paving material may be periodically or continuously mixed at the holding location and maintained at a desired temperature. The temperature at which the paving material 108 is maintained may be set based upon a desired temperature at which the paving material 108 will be loaded into the haul trucks 104. Such loading temperature may be based upon the desired temperature at which the load will be delivered to the paving machine 106, the ambient temperature of the air, the expected time required for the haul truck 104 to drive from the paving material plant 102 to the paving machine 106, as well as any expected or anticipated waiting time for the haul 104 truck at the worksite 112.

The paving system 100 shown in FIG. 1 may also include a control system 120 and one or more system controllers 122. In some examples, the control system 120 and/or the system controller 122 may be located at the paving material plant 102. In such examples, the control system 120 and/or the system controller 122 may also include components located remotely from the paving material plant 102 such as on or in any of the machines of the paving system 100, at the worksite 112, and/or at a remote command center (not shown). In other examples, the control system 120 and/or the system controller 122 may be located remote from the paving material plant 102 and/or remoter from the worksite 112, such as at the remote command center referred to above. In any of the examples described herein, the functionality of system controller 122 may be distributed so that certain operations are performed at the paving material plant 102 and other operations are performed remotely. For example, some operations of the system controller 122 may be performed at the worksite 112, on one or more of the haul trucks 104, on one or more of the paving machines 106, etc. It is understood that the system controller 122 may comprise a component of the paving system 100, the paving material plant 102, one or more of the haul trucks 104, one or more of the paving machines 106, one or more of the compaction machines 114, 116, 118, a component of a separate mobile device (e.g., a mobile phone, a tablet, a laptop computer, etc.), and/or the control system 120.

The system controller 122 (sometimes referred to herein as "controller") may be an electronic controller that operates in a logical fashion to perform operations, execute control algorithms, store and retrieve data and other desired operations. The system controller 122 may include or access memory, secondary storage devices, processors, and any other components for running an application. The memory and secondary storage devices may be in the form of read-only memory (ROM) or random access memory (RAM) or integrated circuitry that is accessible by the system controller 122, that is operably connected to the system controller 122, and/or that is otherwise associated with the system controller 122. Various other circuits may be associated with the system controller 122 such as power supply circuitry, signal conditioning circuitry, driver circuitry, and other types of circuitry.

The system controller 122 may comprise a single controller or may include more than one controller (such as additional controllers associated with one or more of the haul trucks 104, paving machines 106, compaction machines 114, 116, 118, cold planers (not shown), and/or other machines of the paving system 100) configured to control various functions and/or features of the paving system 100. As used herein, the term "controller" is meant in its broadest sense to include one or more controllers, processors, microprocessors, and/or other data processing and/or computing components that may be associated with the paving system 100, and that may cooperate in controlling various functions and operations of the paving material plant 102 and the machines of the paving system 100. The functionality of the system controller 122 may be implemented in hardware and/or software without regard to the functionality. The system controller 122 may rely on one or more data maps relating to the operating conditions and the operating environment of the paving system 100 that may be stored in the memory of the system controller 122. Each of these data maps may include a collection of data in the form of tables, graphs, and/or equations to maximize the performance and efficiency of the paving system 100 and its operation.

The components of the control system 120 may be in communication with and/or otherwise operably connected to any of the components of the paving system 100 via a network 124. The network 124 may be a local area network ("LAN"), a larger network such as a wide area network ("WAN"), or a collection of networks, such as the Internet. Protocols for network communication (e.g., wireless machine-to-machine communication protocols), such as TCP/IP, may be used to implement the network 124. Although embodiments are described herein as using a network 124 such as the Internet, other distribution techniques may be implemented that transmit information via memory cards, flash memory, or other portable memory devices.

It is also understood that the paving material plant 102, the various haul trucks 104, paving machines 106, compaction machines 114, 116, 118 and/or other components of the paving system 100 may include respective controllers, and each of the respective controllers may be in communication and/or may otherwise be operably connected via the network 124. For example, the network 124 may comprise a component of a wireless communication system of the paving system 100, and as part of such a wireless communication system, the paving material plant 102, the one or more haul trucks 104, the paving machine 106, the one or more compaction machines 114, 116, 116, and/or other components of the paving system 100 may include respective communication devices 126. Such communication devices 126 may be configured to permit wireless transmission of a plurality of signals, instructions, and/or information between the paving material plant 102, the haul trucks 104, the paving machines 106, the compaction machines 114, 116, 118, and the system controller 122, as well as to permit communication with other machines and systems remote from the paving material plant 102, haul trucks 104, paving machines 106, compaction machines 114, 116, 118, and/or the worksite 112. For example, such communication devices 126 may include a transmitter configured to transmit signals to a receiver of one or more other such communication devices 126. In such examples, each communication device 126 may also include a receiver configured to receive such signals. In some examples, the transmitter and the receiver of a particular communication device 126 may be combined as a transceiver or other such component. In any of the examples described herein, such communication devices 126 may also enable communication with one or more tablets, computers, cellular/wireless telephones, personal digital assistants, mobile devices, telematics devices, or other electronic devices 128 located at the worksite 112, at the paving material plant 102, and/or remote from the worksite 112 or the paving material plant 102. Such electronic devices 128 may comprise, for example, mobile phones and/or tablets of project managers (e.g., foremen) overseeing daily paving operations at the worksite 112 and/or at the paving material plant 102.

The network 124, communication devices 126, and/or other components of the wireless communication system described above may implement or utilize any desired system or protocol including any of a plurality of communications standards. The desired protocols will permit wireless communication between the system controller 122, one or more of the communication devices 126, and/or any other desired machines or components of the paving system 100. Examples of wireless communications systems or wireless machine-to-machine communication protocols that may be used by the paving system 100 described herein include a wireless personal area network such as Bluetooth® (e.g., IEEE 802.15), a local area network such as IEEE 802.11b or 802.11g, a cellular network, radio frequency identification ("RFID") or any other system or protocol for data transfer. Other wireless communication systems and/or wireless machine-to-machine communication protocols are contemplated. In some instances, wireless communications may be transmitted and received directly between the control system 120 and a machine (e.g., a paving machine 106, a haul truck 104, etc.) of the paving system 100 or between such machines. In other instances, the communications may be automatically routed without the need for re-transmission by remote personnel.

In example embodiments, one or more machines of the paving system 100 (e.g., the one or more haul trucks 104, the paving machine 106, the one or more compaction machines 114, 116, 118, etc.) may include a location sensor 130 configured to determine a location and/or orientation of the respective machine. In such embodiments, the communication device 126 of the respective machine may be configured to generate and/or transmit signals indicative of such determined locations and/or orientations to, for example, the system controller 122 and/or to the other respective machines of the paving system 100. In some examples, the location sensors 130 of the respective machines may include and/or comprise a component of global navigation satellite system (GNSS) or a global positioning system (GPS). Alternatively, universal total stations (UTS) may be utilized to locate respective positions of the machines. In example embodiments, one or more of the location sensors 130 described herein may comprise a GPS receiver, transmitter, transceiver, laser prisms, and/or other such device, and the location sensor 130 may be in communication with one or more GPS satellites 132 and/or UTS to determine a respective location of the machine to which the location sensor 130 is connected continuously, substantially continuously, or at various time intervals. One or more additional machines of the paving system 100 may also be in communication with the one or more GPS satellites 132 and/or UTS, and such GPS satellites 132 and/or UTS may also be configured to determine respective locations of such additional machines. In any of the examples described herein, machine locations determined by the respective location sensors 130 may be used by the system controller 122 and/or other components of the paving system 100 to coordinate activities of the haul trucks 104, paving machine 106, compaction machines 114, 116, 118, and/or other components of the paving system 100. For example, machine locations determined by the respective location sensors 130 may be used by the system controller 122 and/or other components of the paving system 100 to determine delivery rates of paving material 108 being delivered to the worksite 112 from the paving material plant. As will be described in greater detail below, such machine locations may also be used by the system controller 122 and/or other components of the paving system 100 to identify various components of the paving system 100 and/or to associate a project identifier with one or more asset identifiers uniquely identifying a haul truck 104, a paving machine 106, one or more compaction machines 114, 116, 118, and/or other components of the paving system 100. Such location information may also be used to verify the status (e.g., active, inactive, etc.) of the respective paving system components described herein. As a result, such information and processes may be used to improve the overall efficiency of the paving system 100.

With continued reference to FIG. 1, the paving material plant 102 may include various material delivery components, mixers, heaters, and/or other equipment configured to assist in manufacturing paving material 108 for use in various paving operations. Such equipment may include, for example, one or more conveyors or other devices configured to transport paving material 108 to one or more paving material silos 134 or other holding locations for storage therein. The paving material plant 102 may also include one or more load stations 136 configured to transfer paving material 108 from the one or more paving material silos 134 to a haul truck 104. In such examples, a paving material silo 134 may include one or more sensors 138 configured to determine a temperature of paving material 108 stored within the paving material silo 134 and/or an amount of paving material 108 stored within the paving material silo 134 (e.g., a fill level of the paving material silo 134). Similarly, a load station 136 may include one or more sensors 140 configured to determine the presence and/or location of a haul truck 104, a time at which the haul truck 104 arrived at the load station 136, a time at which the haul truck 104 departed the load station 136, an amount (e.g., a weight) of paving material 108 loaded into the haul truck 104, and/or other operating parameters. In some examples, the sensor 140 may comprise a scale or other mass sensor configured to determine the weight of the haul truck 104 upon entering the load station 136, the weight of the haul truck 104 after paving material has been loaded into the haul truck 104, and/or a change in weight of the haul truck 104.

The paving material plant 102 may also include one or more scale houses, operator stations, or other stations 142 for use by paving material plant personnel. For example, as shown in phantom in FIG. 1, one or more such stations 142 may include a paving material plant controller 144 that is substantially similar to and/or the same as the system controller 122 described above. In some examples, the paving material plant controller 144 may comprise a component of the control system 120. In any of the examples described herein, the paving material plant controller 144 and/or other components of the paving material plant 102 may be configured to monitor, record, and/or communicate activities of the various haul trucks 104 entering and leaving the paving material plant 102. For example, the various sensors of the paving material plant 102 and/or the paving material plant controller 144 may monitor, sense, determine, record, and/or transmit information indicative of a time at which a particular haul truck 104 enters the paving material plant 102, a time at which the haul truck 104 leaves the paving material plant 102, the amount of paving material 108 loaded into the particular departing haul truck 104, the destination of the particular haul truck 104 (e.g., the location of the worksite 112), the operator of the haul truck 104, a project identifier uniquely identifying a particular paving project with which the paving material 108 loaded into the haul truck 104 is associated, an asset identifier (e.g., a license plate number) uniquely identifying the haul truck 104, a source identifier (e.g., a name and/or location of the paving material plant 102) uniquely identifying the paving material plant 102, and/or other information. Such information may be used by, for example, the system controller 122 in any of the operations described herein. As will be described below, such information may also be included in one or more paving material tickets generated at the paving material plant 102.

As noted above, the haul trucks 104 of the paving system 100 may be operative to transport paving material 108 between the paving material plant 102 and one or more of the paving machines 106 located at the worksite 112. Each haul truck 104 may include a chassis 146 that supports a prime mover, such as an engine, and a cab 148 in which an operator may be positioned to provide input instructions to operate the haul truck 104. The engine is operatively connected to and drives a ground engaging drive mechanism such as wheels. A material transport unit such as a dump body 150 is pivotally mounted on the chassis 146 and receives a payload (e.g., paving material 108) to be hauled from one location to another.

Each haul truck 104 may include a truck control system 152 and a truck controller 154 generally similar or identical to the control system 120 and the system controller 122, respectively. The truck control system 152 and the truck controller 154 may be located on the haul truck 104 and may also include components located remotely from the haul truck 104 such as on any of the other machines of the paving system 100, at the paving material plant 102, or at a command center (not shown). The functionality of truck controller 154 may be distributed so that certain functions are performed on the haul truck 104 and other functions are performed remotely. In some examples, the truck control system 152 and/or the truck controller 154 may enable autonomous and/or semi-autonomous control of the haul truck 104.

The haul truck 104 may also be equipped with a plurality sensors connected to and/or otherwise in communication with the truck controller 154 and/or with the system controller 122. Such sensors may be configured to provide data indicative (directly or indirectly) of various operating parameters of the haul truck 104, systems associated with the haul truck 104, and/or the worksite 112 and/or other environment in which the haul truck 104 is operating. In any of the examples described herein, such sensors may comprise components of the truck control system 152, the control system 120, and/or the paving system 100, generally. For example, as noted above, the haul truck 104 may be equipped with a location sensor 130 configured to sense, detect, and/or otherwise determine a location and/or orientation of the haul truck 104. The location sensor 138 may include a plurality of individual sensors that cooperate to generate and provide location signals to the truck controller 154 and/or to the system controller 122 indicative of the location and/or orientation of the haul truck 104. In some examples, the location sensor 130 may be fixed to the cab 148, the chassis 146, and/or any other component of the haul truck 104. In other examples, however, the location sensor 130 may be removably attached to the haul truck 104 and/or disposed within, for example, the cab 148 of the haul truck 104 during operation of the haul truck 104. In some examples, the haul truck 104 may also include a load sensor 156 configured to sense, measure, and/or otherwise determine the load or amount of paving material 108 disposed within the dump body 150. The haul truck 104 may further include a temperature sensor 158 configured to sense, measure, and/or otherwise determine the temperature of the load (e.g., paving material 108) within the dump body 150.

The paving machine 106 may include a frame 160 having a set of ground engaging wheels or tracks 162 mounted thereto, as well as a screed 164 for spreading paving material 108 across a width of the work surface 110. The paving machine 106 may further include a hopper 166 for storing paving material 108 supplied by the haul truck 104 or another supply machine, and a conveyor system which transfers paving material 108 from the hopper 166 to the screed 164. The paving machine 106 may further include a display 168, such as a liquid crystal display (LCD) device. The display 168 may be mounted to the frame 160 for viewing by an operator. In an example embodiment, the display 168 may be configured to display a map of the worksite 112 including icons or other visual indicia representing the work surface 110, the paving machine 106, the haul truck 104, one or more of the compaction machines 114, 116, 118, and/or other components of the paving system 100. The display 168 may also be configured to display one or more of the user interfaces described herein and illustrated in FIG. 3. Such user interfaces may be indicative of, may represent, may illustrate, and/or may comprise one or more of the paving reports described below.

The paving machine 106 may also include a paving machine control system 170 and a paving machine controller 172 generally similar or identical to the control system 120 and the system controller 122, respectively. The paving machine control system 170 and the paving machine controller 172 may be located on the paving machine 106 and may also include components located remotely from the paving machine 106 such as on any of the other machines of the paving system 100, at the paving material plant 102, or at a command center (not shown). The functionality of paving machine controller 172 may be distributed so that certain functions are performed on the paving machine 106 and other functions are performed remotely. In some examples, the paving machine control system 170 and/or the paving machine controller 172 may enable autonomous and/or semi-autonomous control of the paving machine 106. For example, the paving machine controller 172 may be configured to receive one or more paving machine speeds (e.g., one or more desired paving machine speeds) from the system controller 122. In an autonomous or semi-autonomous mode of operation, the paving machine controller 172 and/or the paving machine control system 170, generally, may be operable to cause the paving machine 106 to travel at one or more of the received paving machine speeds while depositing paving material 108 on the work surface 110 in accordance with parameters (e.g., a thickness, a width, etc.) a paving plan.

The paving machine 106 may also be equipped with a plurality sensors connected to and/or otherwise in communication with the paving machine controller 172 and/or with the system controller 122. Such sensors may be configured to provide data indicative (directly or indirectly) of various operating parameters of the paving machine 106, systems associated with the paving machine 106, and/or the worksite 112, and/or other environments in which the paving machine 106 is operating. In any of the examples described herein, such sensors may comprise components of the paving machine control system 170, the control system 120, and/or the paving system 100, generally. For example, in addition to the location sensor 130 and communication device 126 described above, the paving machine 106 may also include a temperature sensor 174 mounted, for example, on or proximate the screed 164. The temperature sensor 174 may be positioned and/or otherwise configured to determine the temperature of the mat of paving material 108 deposited on the work surface 110 by the screed 164. In some examples, the temperature sensor 174 may comprise an optical temperature sensor such as an infrared camera, whereas in other embodiments the temperature sensor 174 may comprise a non-optical sensor such as a digital or analog thermometer. While the temperature sensor 174 is shown mounted on the screed 164 such that it can determine the temperature of paving material 108 deposited on the work surface 110 and located behind the screed 164 as paving progresses, the present disclosure is not limited to this configuration. For example, in other embodiments the temperature sensor 174 may be mounted at a different location on the paving machine 106, and may be configured to sense paving material temperature within paving machine 106.

As noted above, the paving system 100 may include one or more compaction machines 114, 116, 118 configured to compact the mat of paving material 108 deposited by the paving machine 106. In some examples, the compaction machine 114 may comprise a "breakdown" compactor having a breakdown drum 176, and the compaction machine 114 may be configured to follow relatively closely behind the paving machine 106, such that the breakdown drum 176 can compact paving material 108 distributed by the paving machine 106 while the paving material 108 is still relatively hot. Compacting with the compaction machine 114 when the paving material 108 is still relatively hot allows the breakdown drum 176 of the compaction machine 114 to perform a relatively large proportion of the total compaction desired for a particular lift of paving material 108, as relatively hotter asphalt in the paving material 108 can flow relatively readily and is thus readily compacted. In an example embodiment, the compaction machine 114 may be used primarily to compact paving material 108 which has not yet cooled to a "tender zone" temperature range. In such an example, the "tender zone" is a temperature range at which the paving material 108 moves or shoves in front of the advancing compaction machine drum (e.g., the breakdown drum 176), making attempted compaction generally undesirable. The actual temperature range at which the paving material 108 will be within the tender zone will depend upon the particular paving material mix, and in some examples, the paving material 108 may enter the tender zone when the temperature is between about 115 degrees Celsius and about 135 degrees Celsius. In some examples, paving material 108 may be below the tender zone when its temperature falls to between about 65 degrees Celsius and about 95 degrees Celsius. Accordingly, it will typically be desirable to compact paving material 108 with the compaction machine 114 when the temperature is above this range.

In addition to the communication device 126 and the location sensor 130 described above, the compaction machine 114 may further include any number of additional sensors configured to assist the compaction machine 114 in performing various paving (e.g., compaction) tasks. For example, such sensors may include one or more accelerometers or vibration sensors configured to sense the level of vibration (e.g., impacts per foot) imparted by the breakdown drum 176. The compaction machine 114 may also include a temperature sensor 178 mounted thereon and configured to sense, measure, and/or otherwise determine a temperature of the paving material 108 with which the compaction machine 114 is interacting or with which it has interacted. In some examples, the temperature sensor 178 may be substantially similar to and/or the same as the temperature sensor 174 of the paving machine 106.

The compaction machine 116 may be substantially similar to and/or the same as the compaction machine 114. In some examples, the compaction machine 116 may comprise an "intermediate" compactor, and may include an intermediate drum 180 which compacts paving material 108 already compacted at least once by the compaction machine 114. It will typically be desirable to compact paving material 108 with the compaction machine 116 after the paving material 108 has cooled to a temperature below the tender zone. The compaction machine 116 may include a sensor or other device configured to sense a smoothness and/or stiffness of the paving material 108. Additionally, the compaction machine 116 may include the communication device 126 and the location sensor 130 described above, as well as any number of additional sensors configured to assist the compaction machine 116 in performing various paving (e.g., compaction) tasks. For example, such sensors may include one or more accelerometers or vibration sensors configured to sense the level of vibration (e.g., impacts per foot) imparted by the intermediate drum 180. The compaction machine 116 may also include a temperature sensor 182 mounted thereon and configured to sense, measure, and/or otherwise determine a temperature of the paving material 108 with which the compaction machine 116 is interacting or with which it has interacted. In some examples, the temperature sensor 182 may be substantially similar to and/or the same as the temperature sensor 174 of the paving machine 106.

The compaction machine 118 may also be substantially similar to and/or the same as the compaction machine 114. In some examples, the compaction machine 118 may comprise a "finishing" compactor, and may include a finish drum 184 configured to perform a final squeeze of the paving material 108. In such examples, the compaction machine 118 may be configured to follow relatively closely behind compaction machine 116. In some instances, it will be desirable to compact paving material 108 with the compaction machine 118 prior to its cooling below a temperature in the range of about 50 degrees Celsius to about 65 degrees Celsius. Even where the paving material 108 is compacted to a specified relative compaction state, if compaction takes place at too low of a temperature, the aggregate in the paving material 108 may crack, creating voids which can negatively impact the long term viability of the compacted surface. To this end, the compaction machine 118 may also include a temperature sensor 186 to verify whether the final compaction is taking place at an appropriate paving material temperature. As noted above with respect to the compaction machines 114, 116, the compaction machine 118 may also include a communication device 126 and a location sensor 130, as well as any number of additional sensors configured to assist the compaction machine 118 in performing various paving (e.g., compaction) tasks. For example, such sensors may include one or more accelerometers or vibration sensors.

Figure 2:
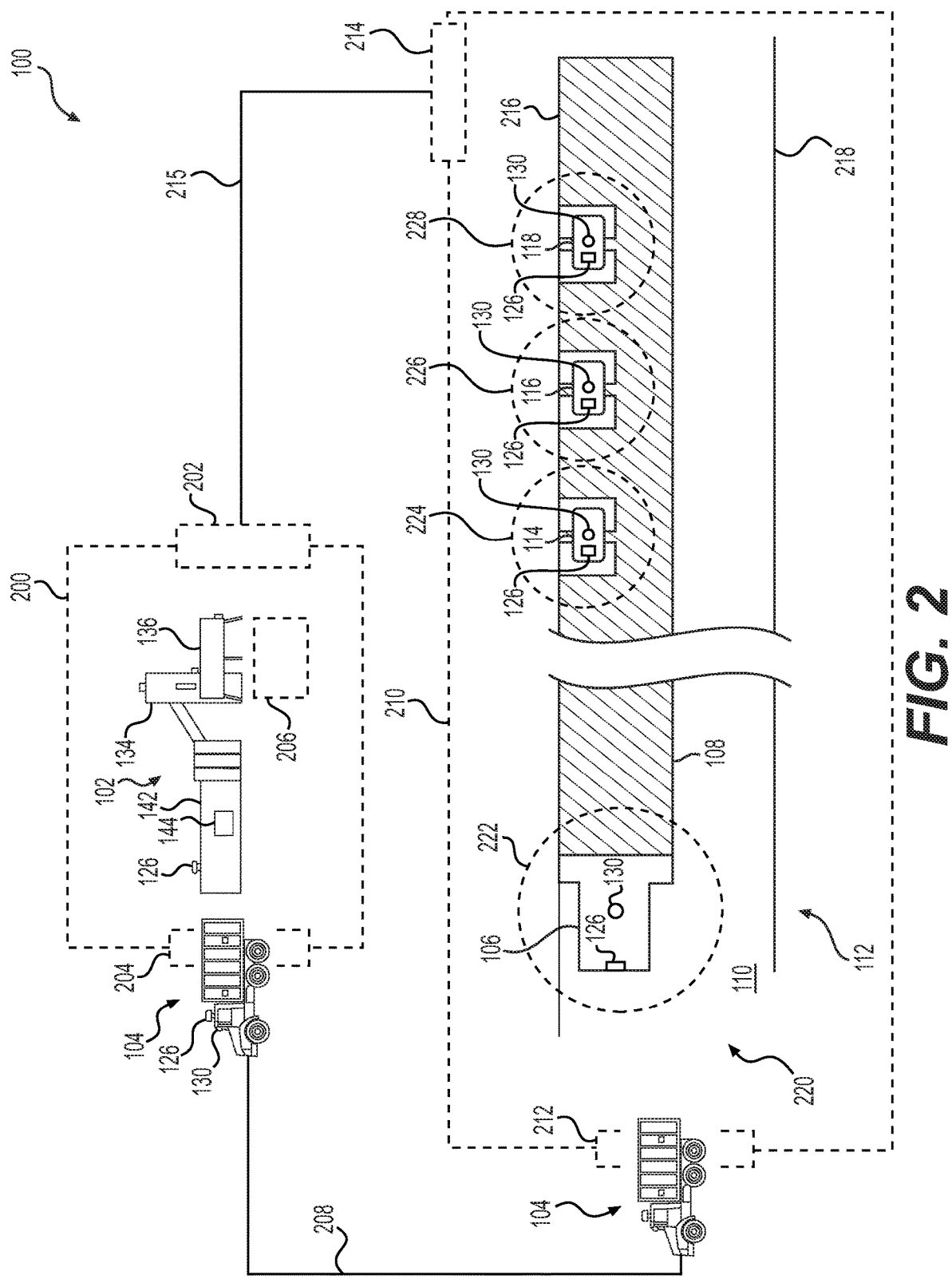
FIG. 2 is a schematic illustration of an example paving material plant and an example worksite at which one or more components of the paving system shown in FIG. 1 may be utilized.

FIG. 2 is an example schematic diagram illustrating various components of the paving system 100 performing respective paving operations. For example, FIG. 2 illustrates a paving machine 106 depositing paving material 108 onto the work surface 110 of the worksite 112. In particular, FIG. 2 illustrates the paving machine 106 depositing a mat of paving material 108 within a first boundary 216 (e.g., a right-hand side boundary) and a second boundary 218 (e.g., a left-hand side boundary) of a cut area 220 forming the work surface 110. In such examples, the cut area 220 may be formed by one or more cold planers or other excavation machines (not shown). In such examples, the cold planer or other excavation machines may act on a roadway or other paved surface of the worksite 112 to form the work surface 110 prior to the paving machine 106 depositing paving material 108 onto the work surface 110. The cut area 220 may have any desirable depth (in a direction into the page), and the paving machine 106 may be configured to deposit a mat of paving material 108 having a thickness (in a direction into the page) that is greater than or equal to the depth of the cut area 220.

As noted above, example paving systems 100 of the present disclosure, and in some examples, the control system 120 of the paving system 100, may be used to detect, determine, monitor, coordinate, and/or facilitate various operations of the haul truck 104, the paving machine 106, the compaction machines 114, 116, 118, and/or other components of the paving system 100. For example, as shown in FIG. 2, the paving system 100 may include one or more geofences generated, located, and/or otherwise configured to assist with monitoring such operations. In any of the examples described herein, such geofences may comprise, for example, a virtual geographic boundary defined by GPS, cellular, near-field communication, RFID, and/or other components of the control system 120 (FIG. 1). Such geofences may enable the system controller 122, software operable on the system controller 122, and/or other components of the control system 120 to generate a signal or other response when a location sensor 130 carried by and/or disposed on a haul truck 104, a paving machine 106, one or more of the compaction machines 114, 116, 118, and/or other components of the paving system 100 enters or leaves the virtual geographic boundary of the geofence. In some examples, the respective location sensors 130 may emit signals continuously, substantially continuously, or at predetermined intervals (e.g., every second, every two seconds, every five seconds, every ten seconds, every 15 seconds, etc.), and such signals may include information indicating the location of the component of the paving system 100 within or on which the location sensor 130 is disposed. In such examples, the system controller 122 may be configured to determine whether the location sensor 130 and, thus, the respective component of the paving system 100 is located within one or more geofences based at least partly on such signals. Such signals may also include metadata or other components providing information uniquely identifying the location sensor 130 and/or the component of the paving system 100 (e.g., the haul truck 104) on which or in which the particular location sensor 130 is disposed. For example, such signals may include a device identifier uniquely identifying the location sensor 130 generating the signal. Additionally or alternatively, such signals may include an asset identifier uniquely identifying the component of the paving system 100 on which or in which the particular location sensor 130 is disposed. Such device identifiers, asset identifiers, and other unique identifiers will be described in greater detail below.

As shown in FIG. 2, an example paving system 100 of the present disclosure may include a geofence 200 extending substantially along and/or otherwise substantially overlaying a perimeter of the paving material plant 102. Such a geofence 200 may, thus, substantially surround the paving material plant 102 and may correspond to an outer boundary of the paving plant 102. In such examples, a haul truck 104 may pass into the geofence 200 when entering the paving material plant 102 via a gate or other like entrance 202 of the paving material plant 102. Similarly, a haul truck 104 may pass out of the geofence 200 when exiting the paving material plant 102 via a gate or other like exit 204 of the paving material plant 102. Upon entering the paving material plant 102 via the entrance 202, a haul truck 104 may travel to one or more locations within the paving material plant 102 including a loading area associated with the paving material silo 134, a holding station proximate the load station 136, or any other such locations. In such examples, the paving system 100 may also include one or more respective geofences 206 extending substantially along and/or otherwise substantially overlaying a perimeter of such locations. In such examples, each geofence 206 may define a virtual boundary of the respective location within the paving material plant 102, and one or more of the geofences 206 may be disposed at least partly within the geofence 200.

In any of the examples described herein, a haul truck 104 may travel to a location (e.g., a location associated with the geofence 206) associated with the load station 136 where the haul truck 104 may be loaded with paving material 108 that is to be transported from the paving material plant 102 to the worksite 112. Before, during, or after being loaded with paving material 108, an operator of the haul truck 104 may be provided with a paving material ticket associated with the paving material 108 loaded into the haul truck 104. In some examples, such a paving material ticket may comprise a text file, an image file, a data file, and/or any other digital or electronic file configured to contain information, and to be executed and/or otherwise consumed by a server, a computer, a mobile phone, and/or other electronic device. Such a paving material ticket may be saved within a memory connected to and/or otherwise associated with the paving material plant controller 144 and/or the system controller 122, and may be transmitted to one or more additional electronic devices (e.g., an electronic device 128 carried by the operator of the haul truck 104, an electronic device 128 carried by a foreman or supervisor at the worksite 112, the truck controller 154, etc.) via, for example, the network 124. Additionally or alternatively, such a paving material ticket may comprise a physical card, ticket, piece of paper, or other physical object including any of the information described herein and configured for consumption by a human. Such a paving material ticket may be printed on an ink jet printer, a laser printer, or other printing device connected to the paving material plant controller 144 and/or the system controller 122.

An example paving material ticket may include information indicating the weight, volume, composition, temperature, and/or other characteristics of the paving material 108 deposited into the dump body 150 of the haul truck 104 at the paving material plant 102. Such a paving material ticket may also include a name, an address, GPS coordinates, and/or other information uniquely identifying the worksite 112 at which the paving material 108 will be utilized (e.g., a worksite identifier). In further examples, such a paving material ticket may also include a license plate number, an alphanumeric code, a serial number, and/or other information uniquely identifying the particular haul truck 104 receiving such paving material 108 at the paving material plant 102 (e.g., an asset identifier). For example, a paving plant employee may observe the asset identifier associated with a particular haul truck 104 during inspection of the haul truck 104 before, during, or after the haul truck 104 is loaded with paving material 108. In such examples, the paving plant employee may record the asset identifier, and may provide an input to the paving material plant controller 144 and/or to the system controller 122 including information indicating the asset identifier. Alternatively, one or more cameras, scanners, RFID readers, near-field communication scanners, barcode readers, or other detection devices may automatically capture and/or otherwise observe the asset identifier associated with the haul truck 104 before, during, or after the haul truck 104 is loaded with paving material 108. In such examples, the one or more cameras or other detection devices may send a signal to the paving material plant controller 144 and/or to the system controller 122 including information indicating the asset identifier associated with the haul truck 104. In any of the examples described herein, the paving material plant controller 144 may generate the paving material ticket based at least partly on the haul truck 104 receiving the paving material 108 at the paving material silo 134 of the paving plant 102, and an example paving material ticket may include the asset identifier uniquely identifying the particular haul truck 104 receiving the paving material 108.

Further, any of the paving material tickets described herein may include a timestamp indicating the date and/or time at which the paving material ticket was generated. Any of the paving material tickets described herein may also include a name, number, address, alphanumeric code, and/or other information uniquely identifying the source of the paving material ticket (e.g., a source identifier). For example, in embodiments in which the paving material ticket is printed and/or otherwise generated at the paving material plant 102, such a source identifier may comprise a name, number, address, or other information uniquely identifying the particular paving material plant 102. Additionally, in any of the examples described herein, the paving material plant 102 may manufacture and/or otherwise produce paving material that is associated with one or more paving projects. Such paving projects may comprise discrete paving operations taking place at various respective locations (e.g., worksites) remote from the paving material plant 102. Such paving projects may include, for example, a roadway paving project, a parking lot paving project, a highway paving project, and/or other discrete paving operations. In such examples, any of the paving material tickets described herein may also include a name, a number, an address, GPS coordinates, an alphanumeric code, and/or or other information uniquely identifying the paving project (e.g., a project identifier) with which the paving material 108 loaded into the haul truck 104 is associated. Collectively, the asset identifiers, project identifiers, source identifiers, paving material information, and/or other information described herein may be referred to as "project information," throughout this disclosure.

In such examples, the system controller 122 and/or the paving material plant controller 144 may associate the project identifier with at least one of the asset identifier and the source identifier in a memory associated with the system controller 122 and/or with the paving material plant controller 144. For example, the system controller 122 and/or the paving material plant controller 144 may associate the project identifier with at least one of the asset identifier and the source identifier by storing such information together in a data file, a text file, a spreadsheet, and/or other electronic file, by embedding, linking, and/or saving corresponding metadata with such information, and/or by other data management processes. The system controller 122 and/or the paving material plant controller 144 may associate the project identifier with at least one of the asset identifier and the source identifier upon receipt of such information and/or as part of the process of generating one or more of the paving material tickets described herein.

After receiving the paving material ticket, the haul truck 104 may travel to the exit 204 of the paving material plant 102, and may pass through the exit 204 in order to exit the paving plant 102. By passing through the exit 204, the haul truck 104 may also exit the geofence 200 corresponding to the perimeter of the paving material plant 102. In some examples, the haul truck 104 may then travel along a travel path 208 extending from the exit 204 to the worksite 112. As shown in FIG. 2, in some examples the paving system 100 may also include a geofence 210 extending substantially along and/or otherwise substantially overlaying at least part of a perimeter of the worksite 112. In some examples, such a geofence 210 may substantially surround the worksite 112 and may correspond to an outer boundary of the worksite 112. In such examples, a haul truck 104 may pass into the geofence 210 when entering the worksite 112 via a gate or other like entrance 212 of the worksite 112. Similarly, a haul truck 104 may pass out of the geofence 210 when exiting the worksite 112 via a gate or other like exit 214 of the worksite 112. Upon entering the worksite 112 via the entrance 212, a haul truck 104 may travel to one or more locations within the worksite 112, including a location at which a paving machine 106 of the paving system 100 is disposed. In such examples, the haul truck 104 may load, dispose, and/or otherwise transfer paving material 108 from the dump body 150 to, for example, the hopper 166 of the paving machine 106. Once the paving material 108 carried by the haul truck 104 has been transferred to the paving machine 106, the haul truck 104 may travel to the exit 214 of the worksite 112, and may pass through the exit 214 in order to exit the worksite 112. By passing through the exit 214, the haul truck 104 may also exit the geofence 210 corresponding to the perimeter of the worksite 112. In some examples, the haul truck 104 may then travel along a travel path 215 extending from the exit 214 to the paving material plant 102.

With continued reference to FIG. 2, in some examples, the paving system 100 may also include respective geofences substantially surrounding one or more of the components of the paving system 100 disposed at the worksite 112. For example, the paving system 100 (e.g., the control system 120 of the paving system 100) may include a geofence 222 substantially overlaying a perimeter of and/or substantially surrounding a paving machine 106 disposed within a perimeter of the worksite 112 (e.g., disposed within the geofence 210). The paving system 100 (e.g., the control system 120 of the paving system 100) may also include a geofence 224 substantially overlaying a perimeter of and/or substantially surrounding a compaction machine 114, a geofence 226 substantially overlaying a perimeter of and/or substantially surrounding a compaction machine 116, and/or a geofence 228 substantially overlaying a perimeter of and/or substantially surrounding a compaction machine 118. In any of the examples described herein, the paving system 100 may further include one or more additional geofences (not shown) substantially overlaying a perimeter of and/or substantially surrounding one or more additional components of the paving system 100 (e.g., substantially surrounding a cold planer or other excavation machine). In such examples, each of the geofences (e.g., the geofences 222, 224, 226, 228 shown in FIG. 2) may be substantially similar to the geofence 206 described above. For example, each of the geofences 222, 224, 226, 228 may define a virtual boundary of a respective location within the worksite 112, and one or more of the geofences 222, 224, 226, 228 may be disposed at least partly within the geofence 210. Further, each of the geofences 222, 224, 226, 228 may be associated with a respective component of the paving system 100, and may move, relative to the work surface 110, commensurate with movement of the respective component of the paving system 100. For example, the geofence 222 may be generated based at least partly on location information generated using the location sensor 130 disposed on and/or carried by the paving machine 106. Such location information may comprise, for example, GPS coordinates indicating the location of the paving machine 106, and such location information may be generated in conjunction with the GPS satellite 132 (FIG. 1). In such examples, the geofence 222 may comprise a substantially circular virtual boundary, substantially surrounding the paving machine 106. In such examples, the location sensor 130 of the paving machine 106, and/or the paving machine 106 generally, may be disposed at a substantially central location (e.g., a center point) within the geofence 222. Further, the geofence 222 may be configured such that the location sensor 130 of the paving machine 106 and/or the paving machine 106 generally is maintained at such a substantially central location within the geofence 222 as the paving machine 106 moves along the work surface 110. Further, it is understood that while the geofence 222 is illustrated as being circular in FIG. 2, in additional embodiments, the geofence 222 may be substantially square, substantially rectangular, substantially hexagonal, substantially octagonal, and/or any other shape. Further, it is understood that the geofence 222 may have any desired radius, diameter, circumference, perimeter, and/or other dimensions in order to substantially surround the paving machine 106. In any of the examples described herein the radius, diameter, circumference, perimeter, and/or other dimensions of the geofence 222 may be larger than, for example, a corresponding perimeter, length, width, and/or other dimension of the paving machine 106 such that the geofence 222 may surround the entire outer boundary and/or perimeter of the paving machine 106.

One or more of the geofences 224, 226, 228 may be substantially similar to the geofence 222 described above. For example, the geofence 224 may be generated based at least partly on location information generated using the location sensor 130 disposed on and/or carried by the compaction machine 114. Such location information may comprise, for example, GPS coordinates indicating the location of the compaction machine 114, and such location information may be generated in conjunction with the GPS satellite 132 (FIG. 1). In such examples, the geofence 224 may comprise a substantially circular virtual boundary, substantially surrounding the compaction machine 114. In such examples, the location sensor 130 of the compaction machine 114, and/or the compaction machine 114 generally, may be disposed at a substantially central location (e.g., a center point) within the geofence 224. Further, the geofence 224 may be configured such that the location sensor 130 of the compaction machine 114, and/or the compaction machine 114 generally, is maintained at such a substantially central location within the geofence 224 as the compaction machine 114 moves along the work surface 110. Further, it is understood that while the geofence 224 is illustrated as being circular in FIG. 2, in additional embodiments, the geofence 224 may be substantially square, substantially rectangular, substantially hexagonal, substantially octagonal, and/or any other shape. Further, it is understood that the geofence 224 may have any desired radius, diameter, circumference, perimeter, and/or other dimensions in order to substantially surround the compaction machine 114. In any of the examples described herein the radius, diameter, circumference, perimeter, and/or other dimensions of the geofence 224 may be larger than, for example, a corresponding perimeter, length, width, and/or other dimension of the compaction machine 114 such that the geofence 224 may surround the entire outer boundary and/or perimeter of the compaction machine 114. In any of the example embodiments herein, one or more of the geofences 226, 228 may be substantially similar to the geofence 224 described above.

Figure 3:
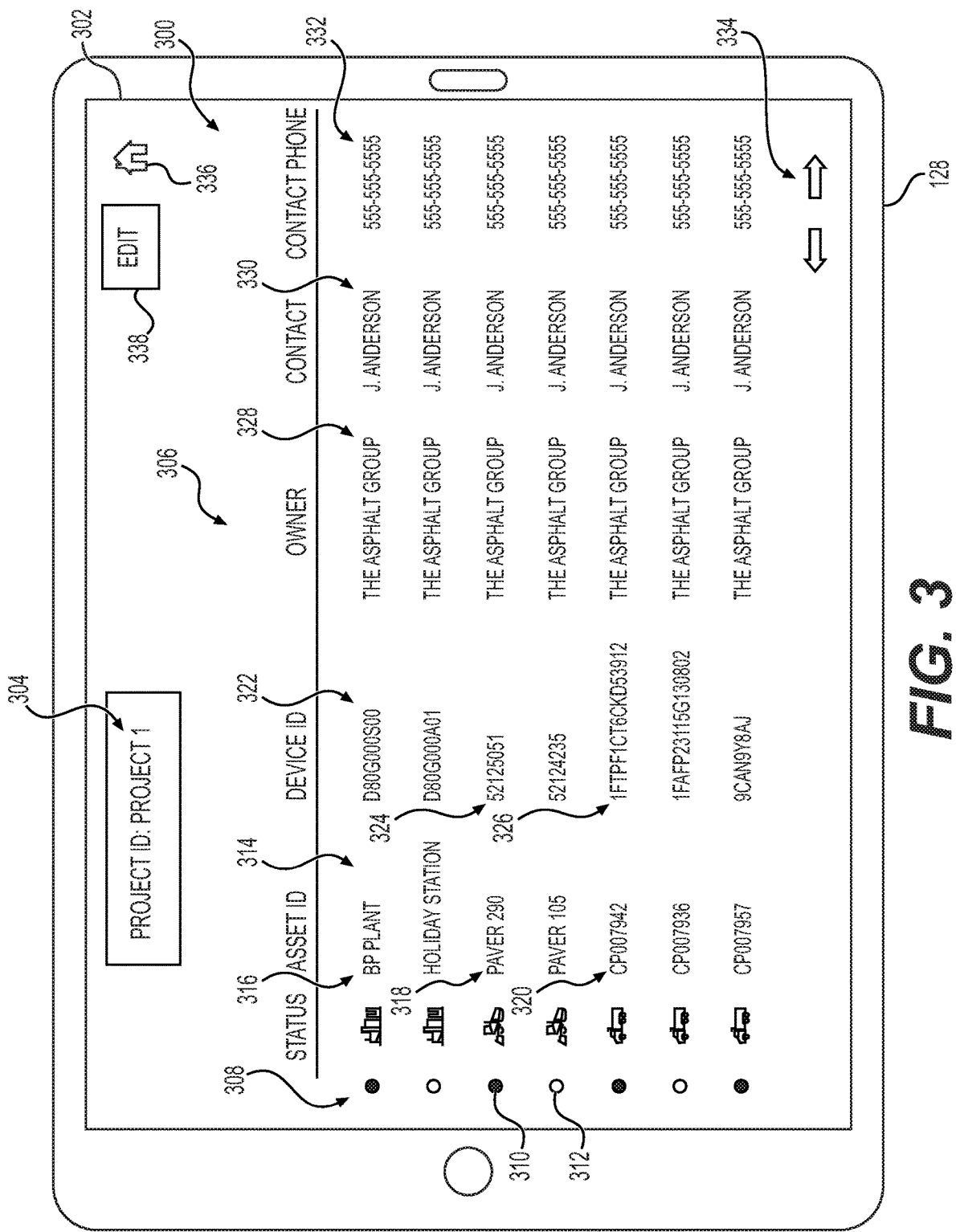
FIG. 3 illustrates an example user interface of the present disclosure. Such an example user interface may be displayed and/or otherwise presented via an electronic device associated with the paving system shown in FIG. 1.

FIG. 3 illustrates an example user interface 300 of the present disclosure. The example user interface 300 may be generated, displayed, and/or otherwise provided via one or more components of the paving system 100. For example, the user interface 300 may be generated by the control system 120, generally, by the system controller 122, by the electronic device 128, by the paving material plant controller 144, and/or by one or more other components of the paving system 100. Similarly, the user interface 300 may be transferred, shared, and/or otherwise provided by or between such components of the paving system 100 via the network 124. Further, the user interface 300 may be output, displayed, and/or otherwise provided via one or more displays (e.g., a touch-sensitive display device, an LCD device, a cathode ray tube monitor, etc.) in communication with one or more such components of the paving system 100. Such displays may be substantially similar to the display 168 described above. For ease of description, the user interface 300 will be described with respect to the electronic device 128 (e.g., with respect to a display 302 or other such display device of the electronic device 128) unless otherwise noted.

In example embodiments, the use interface 300 illustrated in FIG. 3 may comprise a particular page, component, or portion of a paving project application used to monitor various activities and/or operations being performed by various components of the paving system 100. For example, the user interface 300 may comprise a project summary or project report page of a web-based paving project application operable on the electronic device 128. Accordingly, the user interface 300 may comprise a visual illustration of at least part of a project report generated by such a paving project application, and as illustrated in FIG. 3, such an example user interface 300 may include various project information associated with a particular paving project. For example, the user interface 300 may include, and/or otherwise provide a project identifier 304 uniquely identifying a particular paving project that is currently underway. The project identifier 304 shown in FIG. 3 ("Project 1") may comprise the name of the particular paving project. Additionally or alternatively, such a project identifier 304 may comprise a number, an address, an alphanumeric code, and/or or other information uniquely identifying the paving project corresponding to the project information included in the user interface 300.

The user interface 300 may also include additional information 306 (e.g., project information) associated with the particular paving project. For example, such information 306 may include one or more status indicators 308. Such status indicators 308 may comprise, for example, one or more circles, squares, dots, images, icons, and/or other visual indicia identifying and/or representative of a current status (e.g., active, inactive, idle, etc.) associated with a particular component of the paving system 100. For example, one or more of the status indicators 308 may be shaped, sized, hatched, color-coded, positioned, and/or otherwise configured, and one or more such configurations may convey information associated with the status of the corresponding component of the paving system 100. For example, the user interface 300 includes a status indicator 310 that is shaded and/or colored. Such a configuration of the status indicator 310 may indicate that a corresponding component of the paving system 100 (e.g., a paving machine 106 identified as "Paver 290" in the user interface 300 of FIG. 3) is currently active and/or operating at a worksite 112 corresponding to Project 1. The user interface 300 may display such a status indicator 310 next to, above, beneath, proximate, and/or otherwise, in association with information 306 uniquely identifying the paving machine 106 (e.g., the Paver 290) in order to convey information associated with the status of the particular paving machine 106.

As an additional example, the user interface 300 also includes a status indicator 312 that is blank, colored white, and/or that is not shaded or hatched. Such a configuration of the status indicator 312 may indicate that a corresponding component of the paving system 100 (e.g., a paving machine 106 identified as "Paver 105" in the user interface 300 of FIG. 3) is currently inactive and/or is currently not operating at the worksite 112 corresponding to Project 1. In any of the examples described herein, the shape, size, location, and/or other configurations of one or more of the status indicators 308 may indicate whether location information, communication information, and/or other information associated with a corresponding one of the respective components of the paving system 100 was received within a predetermined time range.

For example, the user interface 300 may provide a shaded and/or colored status indicator 310 in association with a component of the paving system 100 (e.g., the Paver 290) in examples in which the system controller 122 and/or other components of the control system 120 received location information from a location sensor 130 associated with the particular paving system component (e.g., the Paver 290) within a predetermined time range. Such a predetermined time range may comprise, for example, 15 minutes, half an hour, one hour, two hours, four hours, eight hours, 24 hours, and/or any other desired time range indicating a relatively high likelihood that the particular paving system component is currently in use in association with the project corresponding to the project identifier 304 (e.g., Project 1). Further, in example embodiments such a predetermined time range may be measured retroactively (e.g., in the past) from a time at which the user interface 300 is generated, a time at which a request for a project report and/or other such information is received by the system controller 122, and/or from any other relevant time associated with the particular paving project. Alternatively, the user interface 300 may provide an unshaded, blank, and/or white/clear status indicator 312 in association with a component of the paving system 100 (e.g., the Paver 105) in examples in which the system controller 122 and/or other components of the control system 120 do not receive location information from a location sensor 130 associated with the particular paving system component (e.g., the Paver 105) within the predetermined time range described above.

In example embodiments, the user interface 300 may also include one or more asset identifiers 314. Each of the asset identifiers 314 may comprise a name, a location (e.g., an address, GPS coordinates, etc.) a license plate number, an alphanumeric code, a serial number, and/or other information uniquely identifying the particular component of the paving system 100 corresponding to the respective asset identifier 314. For example, the user interface 300 includes an asset identifier 316 uniquely identifying a particular paving material plant 102 (e.g., a paving material plant 102 identified as "BP Plant" in the user interface 300 of FIG. 3), an asset identifier 318 uniquely identifying a particular paving machine 106 (e.g., the paving machine 106 identified as "Paver 290" in the user interface 300 of FIG. 3), an asset identifier 320 uniquely identifying a particular haul truck 104 (e.g., a haul truck 104 identified as "CP007942" in the user interface 300 of FIG. 3), as well as other asset identifiers 314 corresponding to additional components of the paving system 100 currently associated with Project 1.

In any of the examples described herein, one of the asset identifier 316 included in the user interface 300 may also comprise a source identifier of the present disclosure. For example, as noted above, any of the paving material tickets described herein may include a name, number, address, alphanumeric code, and/or other information uniquely identifying the source of the paving material ticket (e.g., a source identifier). In embodiments in which a paving material ticket is printed and/or otherwise generated at a paving material plant 102, such a source identifier may comprise a name, number, address, or other asset identifier uniquely identifying the particular paving material plant 102. For example, in embodiments in which such a paving material ticket was printed at the "BP Plant" identified in the user interface 300, the asset identifier 316 associated with the BP Plant may comprise a source identifier uniquely identifying the source of the paving material ticket.

With continued reference to FIG. 3, in some examples the user interface 300 may also include one or more device identifiers 322. Each of the device identifiers 322 may comprise a name, a serial number, an alphanumeric code, and/or other information uniquely identifying a particular location sensor 130, communication device 126, and/or other device disposed on and/or carried by a corresponding component of the paving system 100. For example, the user interface 300 includes a device identifier 324 uniquely identifying a particular location sensor 130 (e.g., a location sensor 130 identified as "52125051" in the user interface 300 of FIG. 3) disposed on and/or carried by the paving machine 100 identified as "Paver 290." The user interface 300 also includes a device identifier 326 uniquely identifying a particular location sensor 130 (e.g., a location sensor 130 identified as "1FTPF1CT6CkD53912" in the user interface 300) disposed on and/or carried by the haul truck 104 identified as "CP007942." The user interface 300 also includes additional device identifiers 322 corresponding to additional location sensors 130, communication devices 126, and/or other devices of the paving system 100 currently associated with Project 1.

In example embodiments, the user interface 300 may further include one or more owner identifiers 328. In such examples, each of the owner identifiers 328 may uniquely identify an individual, a company, and/or other entity owning each of the respective components of the paving system 100 identified by the user interface 300. As shown in FIG. 3, an example user interface 300 may also include one or more contact names 330 associated with each respective owner identifiers 328, as well as contact information 332 (e.g., telephone numbers, email addresses, etc.) associated with each of the respective owner identifiers 328 and/or with each of the respective contact names 330. Further, the user interface 300 may include one or more additional components useful in navigating the user interface 300 and/or in otherwise utilizing the paving project application, generally. For example, the user interface 300 may include one or more navigation controls 334 (e.g., a forward control, a back control, etc.) configured to receive an input from a user, and to enable the user to navigate through various pages of the paving project application in response to such an input. The user interface 300 may also include a home control 336 configured to receive input from the user, and to navigate the user back to a homepage of the paving project application in response to such an input. The user interface 300 may further include an edit control 338 configured to receive an input from the user, and to provide one or more input fields, additional pages of the paving project application, and/or other components of the user interface 300 configured to enable the user to add, delete, and/or modify content associated with the user interface 300. Although not illustrated in FIG. 3, it is understood that example user interfaces 300 of the present disclosure may also include or more additional controls and/or other components configured to assist a user generating a request for a project report, providing such a request to the system controller 122 and/or to other controllers of the paving system 100, generating a project report (e.g., a project report that is represented by the user interface 300 and/or that includes any of the information illustrated in FIG. 3), and/or transmitting or otherwise providing such a project report to one or more components of the paving system 100 via the network 124. Such functionality may further assist an operator of the paving material plant 102, a user of the electronic device 128, a foreman or supervisor of the worksite 112, an operator of the control system 120, and/or other individuals associated with the paving system 100 in determining, monitoring, and/or otherwise coordinating activities of the various components of the paving system 100. Accordingly, such functionality may assist in improving the efficiency of the paving system 100 as the various components of the paving system 100 perform respective operations in a given paving project.

Figure 4:
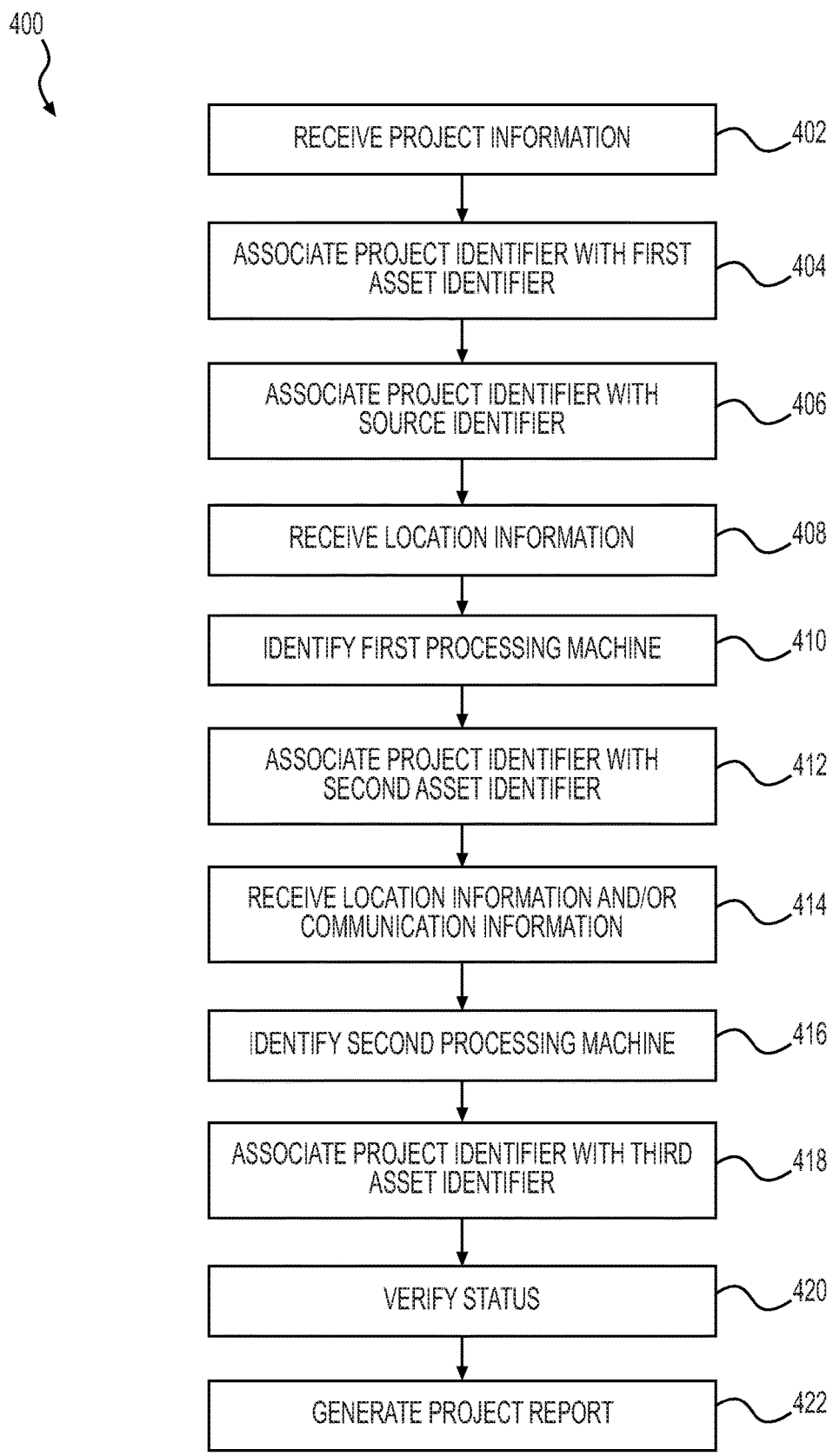
FIG. 4 is a flow chart depicting an example method associated with the paving system shown in FIG. 1.

FIG. 4 illustrates a flow chart depicting an example method 400 of monitoring the operation of a paving system 100. In particular, the flow chart of FIG. 4 illustrates an example method 400 of coordinating the activities of multiple machines and/or other components of the paving system 100 described above in order to improve the efficiency of the paving system 100, thereby improving the efficiency with which components of the paving system 100 may deposit a mat of paving material 108 on a work surface 110 of a worksite 112. As a result of such improved efficiency, the use of fuel and/or other resources by the components of the paving system 100 may be reduced, thereby reducing operating costs. Additionally, due to such improved efficiency, the time required to deposit the mat of paving material 108 may be reduced, thereby further reducing operating costs.

The example method 400 is illustrated as a collection of steps in a logical flow diagram, which represents operations that can be implemented in hardware, software, or a combination thereof. In the context of software, the steps represent computer-executable instructions stored in memory. When such instructions are executed by, for example, the system controller 122, such instructions may cause the system controller 122, various components of the control system 120, the paving material plant controller 144, the truck controller 154, the paving machine controller 172, the electronic device 128, and/or other components of the paving system 100 to perform the recited operations. Such computer-executable instructions may include routines, programs, objects, components, data structures, and the like that perform particular functions or implement particular abstract data types. The order in which the operations are described is not intended to be construed as a limitation, and any number of the described steps can be combined in any order and/or in parallel to implement the process. For discussion purposes, and unless otherwise specified, the method 400 is described with reference to the paving system 100, the control system 120, the system controller 122, the paving material plant 102, and/or other items shown in FIGS. 1-3. In particular, although any part of and/or the entire method 400 may be performed by the truck controller 154, the paving machine controller 172, the paving material plant controller 144, the electronic device 128, and/or other components of the paving system 100, unless otherwise specified, the method 400 will be described below with respect to the system controller 122 for ease of description.

With reference to FIG. 4, at 402 the system controller 122 may receive project information and/or any other information associated with the paving system 100 and/or with a particular paving project being performed by the paving system 100. Such project information may include, for example, information indicating the weight, volume, composition, temperature, and/or other characteristics of paving material 108 deposited into the dump body 150 of a haul truck 104 at a paving material plant 102. Such project information may also include a worksite identifier and/or other information uniquely identifying the worksite 112 at which the paving material 108 will be utilized. In further examples, such project information may also include a license plate number, an alphanumeric code, a serial number, and/or other asset identifier uniquely identifying a particular paving asset (e.g., a particular haul truck 104) receiving such paving material 108 at the paving material plant 102. For example, a paving plant employee may observe the asset identifier associated with a particular haul truck 104 during inspection of the haul truck 104 before, during, or after the haul truck 104 is loaded with paving material 108. In such examples, the paving plant employee may record the asset identifier, and may provide an input to the paving material plant controller 144 and/or to the system controller 122 including information indicating the asset identifier. Alternatively, one or more cameras, scanners, RFID readers, near-field communication scanners, barcode readers, or other detection devices may automatically capture and/or otherwise observe the asset identifier associated with the haul truck 104. In such examples, the one or more cameras or other detection devices may send a signal to the paving material plant controller 144 and/or to the system controller 122 including information indicating the asset identifier associated with the haul truck 104.

The project information received at 402 may further include a timestamp indicating the date and/or time at which a paving material ticket was generated, as well as a name, number, address, alphanumeric code, and/or other source identifier uniquely identifying the source of the paving material ticket. For example, in embodiments in which the paving material ticket is printed and/or otherwise generated at the paving material plant 102, such a source identifier may comprise a name, number, address, or other information uniquely identifying the particular paving material plant 102. Additionally, in any of the examples described herein, the project information received at 402 may include a name, a number, an address, an alphanumeric code, and/or or other project identifier uniquely identifying the paving project with which the paving material 108 loaded into the haul truck 104 is associated. Such a project identifier may be provided by, for example, an operator of the paving material plat 102 before, during, or after the haul truck 104 the paving material 108 is loaded into the haul truck 104.

At 404, the system controller 122 may associate the project identifier with the asset identifier (e.g., a first asset identifier) in a memory connected to, in communication with, and/or otherwise associated with the system controller 122. For example, at 404 the system controller 122 may associate the project identifier with the asset identifier by storing such information together in a data file, a text file, a spreadsheet, and/or other electronic file, by embedding, linking, and/or saving corresponding (e.g., matching) metadata with such information, and/or by other data management processes. At 404, the system controller 122 may associate the project identifier with the asset identifier upon receipt of such information at 402, and/or as part of the process of generating one or more of the paving material tickets described herein.

At 406, the system controller 122 may associate the project identifier with the source identifier in the memory described above with respect to 404. For example, similar to the process described above with respect to 404, at 406 the system controller 122 may associate the project identifier with the source identifier by storing such information together in a data file, a text file, a spreadsheet, and/or other electronic file, by embedding, linking, and/or saving corresponding (e.g., matching) metadata with such information, and/or by other data management processes. At 406, the system controller 122 may associate the project identifier with the source identifier upon receipt of such information at 402, as part of the process described at 404, and/or as part of the process of generating one or more of the paving material tickets described herein. In example embodiments of the present disclosure, the method 400 may include associating the project identifier with both the source identifier and the asset identifier by storing such information together in a data file, a text file, a spreadsheet, and/or other electronic file, by embedding, linking, and/or saving corresponding (e.g., matching) metadata with such information, and/or by other data management processes. In some examples, at 406 the system controller 122 may generate an example paving material ticket of the present disclosure, and the paving material ticket may indicate the project identifier, the source identifier, and/or the asset identifier. Alternatively, in some embodiments, step 406 may be omitted.

At 408, the system controller 122 may receive location information indicating a location of the paving asset with which the asset identifier is associated. For example, at 408 the system controller 122 may receive GPS coordinates, UTS coordinates, and/or other location information generated using a location sensor 130 disposed on and/or carried by a particular haul truck 104 with which the asset identifier received at 402 is associated. Such location information may indicate, among other things, the location of the haul truck 104, and such location information may be generated and/or sent using the location sensor 130 substantially continuously and/or at any desired interval. Additionally or alternatively, at 408 the system controller 122 may receive GPS coordinates, UTS coordinates, and/or other location information generated using a location sensor 130 disposed on and/or carried by a particular paving machine 106, compaction machine 114, 116, 118, and/or other paving system component with which the asset identifier received at 402 (e.g., the first asset identifier) is associated.

At 410, the system controller 122 may identify one or more processing machines and/or other components of the paving system 100. The one or more processing machines identified at 410 may comprise, for example, a paving machine 106, a cold planer or other excavation machine (not shown), and/or one or more compaction machines 114, 116, 116 of the paving system 100. Further, in some example the one or more processing machines identified at 410 may be disposed at a worksite 112 associated with the paving project indicated in the project information received at 402. In any of the examples described herein, the system controller 122 may identify one or more processing machines and/or other components of the paving system 100 at 410 based at least in part on the location information received at 408. Additionally or alternatively, the system controller 122 may identify one or more processing machines and/or other components of the paving system 100 at 410 based at least in part on a geofence associated with the particular processing machine.

For example, as described above with respect to at least FIG. 2, the paving system 100 may include a geofence 222 substantially overlaying a perimeter of and/or substantially surrounding a paving machine 106 disposed on the work surface 110. The paving system 100 may also include a geofence 224 substantially overlaying a perimeter of and/or substantially surrounding a compaction machine 114, a geofence 226 substantially overlaying a perimeter of and/or substantially surrounding a compaction machine 116, and/or a geofence 228 substantially overlaying a perimeter of and/or substantially surrounding a compaction machine 118. The paving system 100 may further include one or more additional geofences (not shown) substantially overlaying a perimeter of and/or substantially surrounding one or more additional components of the paving system 100 (e.g., substantially surrounding a cold planer or other excavation machine). In such examples, one or more such geofences (e.g., one or more of the geofences 222, 224, 226, 228 shown in FIG. 2) may define a virtual boundary of a respective location within the worksite 110. For example, the geofence 222 may be generated based at least partly on location information generated using the location sensor 130 disposed on and/or carried by the paving machine 106. Such location information may comprise, for example, GPS coordinates indicating the location of the paving machine 106, and such location information may be generated in conjunction with the GPS satellite 132 (FIG. 1). In such examples, the geofence 222 may comprise a virtual boundary, substantially surrounding the paving machine 106. In any of the examples described herein the radius, diameter, circumference, perimeter, and/or other dimensions of the geofence 222 may be larger than, for example, a corresponding perimeter, length, width, and/or other dimension of the paving machine 106 such that the geofence 222 may surround the entire outer boundary and/or perimeter of the paving machine 106.

In such examples, at 410 the system controller 122 may identify the paving machine 106 by determining that the location of the haul truck 104 (indicated by the location information received at 408) is within the geofence 222 substantially surrounding the paving machine 106. For example, at 408 and/or at 410 the system controller 122 may also receive location information, geofence perimeter information, and/or other information indicating the location, boundary, and/or other configurations of the geofence 222. Such information (and in some examples, the geofence 222, generally) may be generated using the location sensor 130 disposed on and/or carried by the paving machine 106, and the system controller 122 may receive such information via the network 124. Such information may also include an asset identifier (e.g., a second asset identifier) uniquely indicating the paving machine 106 on which or in which the location sensor 130 is disposed. In some examples, such information may be received from the location sensor 130, together with the location information, geofence perimeter information, and/or other information indicating the location, boundary, and/or other configurations of the geofence 222. Additionally or alternatively, such information may be received from one or more other location sensors 130, communication devices 126, and/or other components of the paving system 100. In such examples, at 410 the system controller 122 may identify the paving machine 106 by determining that the location of the haul truck 104 is within the geofence 222, and by identifying the asset identifier (e.g., the second asset identifier of the paving machine 106) associated with the information indicating the location, boundary, and/or other configurations of the geofence 222. In still further example, at 410 the system controller 112 may identify a cold planer or other excavation machine (not shown) of the paving system 100 in a similar way. For example, at 410 the system controller 112 may identify a cold planer of the paving system 100 by determining that the location of the haul truck 104 is within a geofence surrounding the cold planer, and by identifying the asset identifier (e.g., an asset identifier uniquely identifying the cold planer) associated with the information indicating the location, boundary, and/or other configurations of such a geofence.

At 412, based at least in part on identifying the paving machine 106 and/or other processing machine at 410, the system controller 122 may associate the project identifier with an additional asset identifier (e.g., the second asset identifier uniquely identifying the processing machine identified at 410) in the memory connected to, in communication with, and/or otherwise associated with the system controller 122. For example, at 412 the system controller 122 may associate the project identifier with such an additional asset identifier (e.g., the second asset identifier) by storing such information together in a data file, a text file, a spreadsheet, and/or other electronic file, by embedding, linking, and/or saving corresponding (e.g., matching) metadata with such information, and/or by other data management processes. For example, at 412, based at least in part on determining that the location of the haul truck 104 is within the geofence 222 substantially surrounding the paving machine 106, the system controller 122 may associate the project identifier received at 402 with the additional asset identifier (e.g., the second asset identifier) uniquely identifying the paving machine 106. Similarly, at 412, based at least in part on determining the location of the haul truck 104 is within a geofence substantially surrounding a cold planer, the system controller 112 may associated the project identifier received at 402 with an asset identifier uniquely identifying the cold planer.

At 414, the system controller 122 may receive additional location information. In such examples, the additional location information received at 414 may indicate a location of an additional processing machine disposed at the worksite 112. For example, similar to the process described above with respect to 408, at 414 the system controller 122 may receive GPS coordinates, UTS coordinates, and/or other location information generated using a location sensor 130 disposed on and/or carried by at least one of the compaction machines 114, 116, 118 and/or by one of the other processing machines or components of the paving system 100. Such location information may indicate, among other things, the location of the at least one of the compaction machines 114, 116, 118 (e.g., the compaction machine 114), and such location information may be generated and/or sent using the location sensor 130 substantially continuously and/or at any desired interval.

In such examples, at 416, the system controller 122 may identify one or more additional processing machines and/or other components of the paving system 100. The one or more additional processing machines identified at 416 may comprise, for example, the at least one of the compaction machines 114, 116, 118 (e.g., the compaction machine 114) associated with the location information received at 414. Further, in some example the one or more additional processing machines identified at 416 may be disposed at the worksite 112 associated with the paving project indicated in the project information received at 402. In any of the examples described herein, the system controller 122 may identify one or more additional processing machines and/or other components of the paving system 100 at 416 based at least in part on the location information received at 414. Additionally or alternatively, the system controller 122 may identify the one or more additional processing machines and/or other components of the paving system 100 at 416 based at least in part on a geofence associated with the additional processing machine.

For example, as described above with respect to at least FIG. 2, each of the geofences 222, 224, 226, 228 may be associated with a respective component of the paving system 100. For example, the geofence 224 may be generated based at least partly on location information generated using the location sensor 130 disposed on and/or carried by the compaction machine 114. Such location information may comprise, for example, GPS coordinates indicating the location of the compaction machine 114, and such location information may be generated in conjunction with the GPS satellite 132 (FIG. 1). In such examples, the geofence 224 may comprise a virtual boundary, substantially surrounding the compaction machine 114.

In such examples, at 416 the system controller 122 may identify the compaction machine 114 by determining that the location of the compaction machine 114 (indicated by the location information received at 414) is within the geofence 222 substantially surrounding the paving machine 106 and/or that the geofence 224 associated with the compaction machine 114 at least partly overlaps or intersects the geofence 222. For example, at 414 the system controller 122 may receive location information, geofence perimeter information, and/or other information indicating the location, boundary, and/or other configurations of the geofence 224. Such information (and in some examples, the geofence 224, generally) may be generated using the location sensor 130 disposed on and/or carried by the compaction machine 114, and the system controller 122 may receive such information via the network 124. Such information may also include an asset identifier (e.g., a third asset identifier) uniquely identifying the compaction machine 114 on which or in which the location sensor 130 is disposed. In some examples, such information may be received from the location sensor 130, together with the location information, geofence perimeter information, and/or other information indicating the location, boundary, and/or other configurations of the geofence 224. Additionally or alternatively, such information may be received from one or more other location sensors 130, communication devices 126, and/or other components of the paving system 100. In such examples, at 416 the system controller 122 may identify the compaction machine 114 by determining that the location of the compaction machine 114 is within the geofence 222, and by identifying the asset identifier (e.g., the third asset identifier of the compaction machine 114) associated with the information indicating the location, boundary, and/or other configurations of the geofence 224. Additionally or alternatively, at 416 the system controller 122 may identify the compaction machine 114 by determining that the geofence 224 at least partly overlaps or intersects the geofence 222.

Additionally or alternatively, at 414 the system controller 122 may receive communication information identifying one or more additional processing machines of the paving system 100. For example, the communication information received at 414 may comprise information indicating that the paving machine 106 is in communication with at least one additional processing machine of the paving system 100 via a wireless machine-to-machine communication protocol. Such communication information may comprise one or more signals received from, for example, a communication device 126 of the paving machine 106, from a communication device 126 of a cold planer or other excavation machine (not shown), and/or from a communication device 126 of at least one of the compaction machines 114, 116, 118 (e.g., from the compaction machine 114). In such examples, such communication information may be received by the system controller 122 via the network 124, and such communication information may include, for example, an asset identifier (e.g., the third asset identifier) uniquely identifying the additional processing machine (e.g., the compaction machine 114). In such examples, at 416 the system controller 122 may identify the additional processing machine (e.g., the compaction machine 114) associated with the communication information received at 414.

At 418, based at least in part on receiving the location information and/or the communication information at 414, the system controller 122 may associate the project identifier received at 402 with the additional asset identifier (e.g., the third asset identifier) uniquely identifying the additional processing machine (e.g., the compaction machine 114). For example, similar to the process described above with respect to 412, at 418 the system controller 122 may associate the project identifier with the additional asset identifier uniquely identifying the additional processing machine (e.g., the third asset identifier, received at 414, uniquely identifying the compaction machine 114) by storing such information together in a data file, a text file, a spreadsheet, and/or other electronic file, by embedding, linking, and/or saving corresponding (e.g., matching) metadata with such information, and/or by other data management processes. It is understood that steps 414-418 may be repeated multiple times to identify multiple respective processing machines and/or other components of the paving system 100 disposed at the worksite 112.

At 420, the system controller 122 may verify the status of one or more components of the paving system 100. For example, at 420 the system controller 122 may identify and/or determine whether the location information received at 408 and/or at 414 was received (e.g., is timestamped) within a predetermined time range. In some examples, such a predetermined time range may comprise, for example, 15 minutes, half an hour, one hour, two hours, four hours, eight hours, 24 hours, and/or any other desired time range indicating a relatively high likelihood that the particular paving system component corresponding to the location information is currently in use at the worksite 112. Further, in example embodiments, such a predetermined time range may be measured retroactively (e.g., in the past) from a particular reference time. At 420, the system controller 122 may use a reference time corresponding to and/or identifying a time at which a user interface 300 (FIG. 3) is generated, a time at which a request for a project report and/or other such information is received by the system controller 122, and/or any other relevant point in time associated with the particular paving project. As noted above, in examples in which location information was received within the predetermined time range, the system controller 122 may provide a status indicator and/or any other indication that the paving system components associated with such location information is/are currently active. Alternatively, in examples in which location information was not received within the predetermined time range, the system controller 122 may provide a status indicator and/or any other indication that the paving system components associated with such location information is/are currently inactive.

In any of the examples described herein, the system controller 122 may receive a request, via the network 124, for a project report summarizing the status, activities, and/or other characteristics of the various components of the paving system 100. In some examples, the system controller 122 may verify the status of one or more components of the paving system 100 at 420 based at least in part on such a request. Further, in some examples, at 420 the system controller 122 may verify the status of one or more components of the paving system 100 continuously, substantially continuously, at one or more predetermined intervals, and/or based at least in part on the occurrence of one or more tasks or events associated with a paving project. Such events may include, for example, entry of a component of the paving system 100 into a geofence, passage of a component of the paving system 100 out of a geofence, receipt of location information by the system controller 122, receipt of information indicative of machine-to-machine communication by the system controller 122, loading of paving material 108 into a haul truck 104, generation of a paving ticket, and/or other such events associated with a paving project.

For example, as part of the method 400, the system controller 122 may determine that a first event (e.g., the haul truck 104 entering the geofence 200 associated with the paving material plant 102) has occurred based on information received from the location sensor 130 of the haul truck 104 via the network 124. It is understood that such a first event is merely one example, and the present disclosure should not be interpreted as being limited to such an event. In such an example, the system controller 122 may determine that the haul truck 104 is active based at least in part on receiving such location information. Additionally, if the haul truck 104 is associated with a paving project (e.g., Project 1 described above with respect to FIG. 2) the system controller 122 may determine that the haul truck 104 should remain active on such a paving project based at least in part on receiving such location information. For example, because such a first event is not necessarily indicative of a particular paving project, the system controller 122 may maintain the established association between the haul truck 104 and such a paving project (e.g., Project 1).

In the above example, the haul truck 104 may travel to the load station 136 and may be loaded with paving material 108. The loading of the haul truck 104 with paving material 108 and/or the generation of a paving ticket corresponding to the paving material 108 may comprise a second event. In this example, and unlike the first event described above, the second event may be indicative of a particular paving project. For instance, the paving material 108 received by the haul truck 104 may be associated with Project 1. In such a scenario, if the haul truck 104 is associated with Project 1, the system controller 122 may determine that the haul truck 104 should remain active on Project 1 based at least in part on location information indicating that the haul truck 104 entered the geofence 206, and/or on project information identifying Project 1 received in conjunction with the haul truck 104 being loaded with the paving material 108. Because such a second event is indicative of Project 1, the system controller 122 may maintain the established association between the haul truck 104 and the project identifier uniquely identifying Project 1.

On the other hand, in some examples the paving material 108 received by the haul truck 104 during the second event may be associated with a paving project (e.g., a Project 2) that is different from the paving project with which the haul truck 104 is currently associated. In such an alternate scenario, if the haul truck 104 is currently associated with Project 1, the system controller 122 may determine that the haul truck 104 should be inactive on Project 1 and active on Project 2 based at least in part on location information indicating that the haul truck 104 entered the geofence 206, and/or on project information identifying Project 2 received in conjunction with the haul truck 104 being loaded with the paving material 108. Because such a second event is indicative of Project 2 (and not Project 1 previously associated with the haul truck 104), the system controller 122 may modify the project identifier with which the haul truck 104 is associated.

At 422, the system controller 122 may generate a project report indicating the project identifier received at 402 in association with the asset identifier identified at 404 and with the asset identifier identified at 412. Such an example project report is represented by the user interface 300 described above with respect to FIG. 3. In such examples, the project report may be generated at 422 based at least in part on receiving a request, via the network 124, for the project report. Further, at 422 the system controller 122 may provide the project report to the electronic device 124, the paving material plant controller 144, and/or to one or more additional components of the paving system 100, via the network 124.

INDUSTRIAL APPLICABILITY

The present disclosure describes systems and methods for associating each of the components of a paving system 100 with a particular paving project. The systems and methods described herein are also operable to determine the current status (active or inactive) of each of the paving system components. Such systems and methods may be used to more efficiently coordinate the activities of one or more haul trucks 104, paving machines 106, compaction machines 114, 116, 118, and/or other machines or equipment of the paving system 100.

For instance, a system controller 122 of the paving system 100 may receive project information including a project identifier uniquely identifying a particular paving project, and a first asset identifier uniquely identifying a first paving asset (e.g., a haul truck 104). The system controller 122 may associate the project identifier with the first asset identifier. The system controller 122 may also identify a processing machine (e.g., a paving machine 106) disposed at a remote worksite 112 based on location information associated with the first paving asset and a geofence associated with the processing machine. Based at least in part on identifying the processing machine, the system controller 122 may associate the project identifier with a second asset identifier uniquely identifying the processing machine.

The system controller 122 may also identify one or more additional processing machines (e.g., one or more compaction machines 114, 116, 118) at the worksite 112 in a similar manner. For example, the system controller 122 may identify one or more such additional processing machines based on location information associated with the respective additional processing machines as well as information corresponding to the geofence described above. In such examples, the system controller 122 may associate the project identifier with respective additional asset identifiers uniquely identifying the additional processing machines. In some examples, the system controller 122 may also generate a project report indicating the project identifier in association with one or more of the asset identifiers described above, and may provide such a project report to a foreman, a paving project manager, and/or other individuals associated with the paving system 100.

Such a project report may be used by such individuals to improve the efficiency of the paving system 100 and to reduce cost. For example, the information included in such a project report may be used to improve the consistency and dependability of paving material deliveries at the worksite 112. As a result, the use of fuel and/or other resources associated with the operation of haul trucks 104, paving machines 106, and/or other paving system components may be reduced, thereby decreasing operating costs. Further, managing the delivery of paving material to the work site effectively can minimize and/or substantially eliminate paving machine stoppages during the paving process. As a result, the consistency and/or quality of the mat of paving material 108 may be maximized. Additionally, time and other human resources may be managed more effectively through the use of such information, thererby creating the opportunity to reduce downtime and further reduce operating costs.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A method, comprising:
    receiving project information with a controller, the project information including:
        a project identifier uniquely identifying a paving project, and
        a first asset identifier uniquely identifying a first paving asset;
    associating the project identifier with the first asset identifier in a memory associated with the controller;
    receiving first location information with the controller, the first location information indicating a first location of the first paving asset;
    identifying, with the controller, a first processing machine disposed at a worksite associated with the paving project, wherein the first processing machine is identified based at least in part on determining that the first location of the first paving asset is within a geofence substantially surrounding the first processing machine, the geofence being a virtual boundary defined based on second location information indicating a second location of the first processing machine; and
    based at least in part on identifying the first processing machine, associating, in the memory, the project identifier with a second asset identifier, the second asset identifier uniquely identifying the first processing machine.

2. The method of claim 1, wherein the first paving asset comprises a haul truck configured to transport paving material to the worksite, and the first processing machine comprises a paving machine configured to receive the paving material from the haul truck.

3. The method of claim 1, further comprising generating a paving material ticket, the paving material ticket indicating the project identifier, the first asset identifier, and a source identifier, the source identifier uniquely identifying a paving material plant producing paving material associated with the paving project.

4. The method of claim 1, wherein the first location information is generated using a first location sensor of the first paving asset, and the geofence is generated based on the second location information, the second location information being generated by a second location sensor of the first processing machine.

5. The method of claim 1, wherein identifying the first processing machine comprises receiving the second asset identifier, and additional information identifying the geofence, with the controller via a network.

6. The method of claim 1, further comprising receiving third location information with the controller, the third location information indicating a third location of a second processing machine disposed at the worksite.

7. The method of claim 6, further comprising:
    determining, with the controller, that the third location is within the geofence; and
    based at least in part on determining that the third location is within the geofence, associating the project identifier, in the memory, with a third asset identifier, the third asset identifier uniquely identifying the second processing machine.

8. The method of claim 1, further comprising receiving communication information with the controller, the communication information identifying a second processing machine in communication with the first processing machine via a wireless machine-to-machine communication protocol.

9. The method of claim 8, further comprising, based at least in part on receiving the communication information, associating the project identifier, in the memory, with a third asset identifier, the third asset identifier uniquely identifying the second processing machine.

10. A method, comprising:
    receiving, with a controller, a project identifier uniquely identifying a paving project associated with a worksite;
    receiving, with the controller, a first asset identifier uniquely identifying a haul truck receiving paving material associated with the paving project;
    associating the project identifier with the first asset identifier in a memory associated with the controller;
    receiving, with the controller, first location information, wherein the first location information is generated using a first location sensor of the haul truck and indicates a first location of the haul truck;
    determining, with the controller, that the first location of the haul truck is within a geofence substantially surrounding a paving machine disposed at the worksite, wherein the geofence is a virtual boundary defined based on second location information, the second location information being generated using a second location sensor of the paving machine;
    based at least in part on the determining, associating, in the memory, the project identifier with a second asset identifier, the second asset identifier uniquely identifying the paving machine; and generating, with the controller, a project report indicating the project identifier in association with the first asset identifier and the second asset identifier.

11. The method of claim 10, wherein:
the controller is disposed remote from the worksite,
the controller is in communication with a network, and
at least one of the first asset identifier, the first location information, and the second asset identifier is received via the network.

12. The method of claim 10, further comprising associating, in the memory, the project identifier with a paving material plant identifier, the paving material plant identifier uniquely identifying a paving material plant from which the haul truck receives the paving material.

13. The method of claim 10, further comprising determining that the first location information was received within a predetermined time range,
the project report including a status indicator associated with the first asset identifier, the status indicator indicating that the first location information was received within the predetermined time range.

14. The method of claim 10, wherein the controller is in communication with a network, the method further comprising:
receiving a request, with the controller, via the network; and
based at least in part on the request, providing the project report to an electronic device via the network.

15. The method of claim 10, further comprising:
associating, with the controller, the project identifier with a third asset identifier, the third asset identifier uniquely identifying a compaction machine disposed at the worksite, based on at least one of:
determining, using third location information indicating a third location of the compaction machine, that the third location is within the geofence, or
determining that a first communication device of the paving machine is in communication with a second communication device of the compaction machine via a wireless machine-to-machine communication protocol.

16. A paving system, comprising:
a controller;
a haul truck configured to transport paving material from a paving material plant to a worksite remote from the controller;
a location sensor configured to determine a first location of the haul truck; and
a paving machine disposed at the worksite and configured to receive the paving material from the haul truck,
wherein the controller is configured to:
receive a project identifier uniquely identifying a paving project associated with the worksite,
receive a first asset identifier uniquely identifying the haul truck,
associate the project identifier with the first asset identifier in a memory associated with the controller,
receive first location information from the location sensor, the first location information indicating the first location of the haul truck,
determine, based at least in part on the first location information, that the first location of the haul truck is within a geofence substantially surrounding the paving machine, the geofence being a virtual boundary defined based on second location information indicating a second location of the paving machine,
based at least in part on determining that the first location is within the geofence, associate, in the memory, the project identifier with a second asset identifier, the second asset identifier uniquely identifying the paving machine, and
generate a project report indicating the project identifier in association with the first asset identifier and the second asset identifier.

17. The paving system of claim 16, wherein the geofence comprises a first geofence disposed within a second geofence, the second geofence substantially surrounding the worksite.

18. The paving system of claim 16, further comprising:
a compaction machine disposed at the worksite; and
an additional location sensor configured to determine a third location of the compaction machine.

19. The paving system of claim 18, wherein the controller is further configured to:
receive third location information from the additional location sensor, the third location information indicating the third location of the compaction machine,
determine that the third location of the compaction machine is within the geofence; and
based at least in part on determining that the third location of the compaction machine is within the geofence, associating the project identifier, in the memory, with a third asset identifier, the third asset identifier uniquely identifying the compaction machine.

20. The paving system of claim 16, further comprising:
a compaction machine disposed at the worksite;
a first communication device associated with the paving machine; and
a second communication device associated with the compaction machine and in communication with the first communication device via a wireless machine-to-machine communication protocol, wherein the controller is further configured to:
receive communication information, the communication information identifying the compaction machine based at least in part on the wireless machine-to-machine communication protocol, and
based at least in part on receiving the communication information, associate the project identifier, in the memory, with a third asset identifier, the third asset identifier uniquely identifying the compaction machine.

* * * * *